United States Patent [19]

(12) United States Patent
Sasaki et al.

(10) Patent No.: US 10,252,649 B2
(45) Date of Patent: Apr. 9, 2019

(54) VIBRATION DAMPING DEVICE AND VEHICLE SEAT PROVIDED WITH THE VIBRATION DAMPING DEVICE

(71) Applicant: NHK SPRING CO., LTD., Yokomaha-shi (JP)

(72) Inventors: Yoshitaka Sasaki, Yokohama (JP); Yuji Tokiwa, Yokohama (JP); Katsuji Goto, Yokohama (JP); Yoshinori Otake, Yokohama (JP); Masakazu Ando, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/785,226

(22) Filed: Oct. 16, 2017

(65) Prior Publication Data

US 2018/0111525 A1   Apr. 26, 2018

(30) Foreign Application Priority Data

Oct. 20, 2016 (JP) .................................. 2016-206366

(51) Int. Cl.
*B60N 2/42* (2006.01)
*B60N 2/427* (2006.01)
(Continued)

(52) U.S. Cl.
CPC .............. *B60N 2/544* (2013.01); *B60N 2/50* (2013.01); *B60N 2/503* (2013.01); *B60N 2/68* (2013.01);
(Continued)

(58) Field of Classification Search
CPC .......... B60N 2/544; B60N 2/503; B60N 2/50; F16F 7/116; F16F 2234/02; F16F 2222/08; F16F 2232/08
(Continued)

(56) References Cited

U.S. PATENT DOCUMENTS 3,572,828 A * 3/1971 Lehner ................... A47C 31/00
                                                        248/567
3,608,855 A * 9/1971 Osenberg ............... B60N 2/502
                                                        248/419
(Continued)

FOREIGN PATENT DOCUMENTS

DE   102005019323 B3   7/2006
DE   102005027468 B3   7/2006
(Continued)

OTHER PUBLICATIONS

Extended European Search Report dated Mar. 2, 2018 for Application No. 17195384.7 in 8 pages.

*Primary Examiner* — Rodney B White
(74) *Attorney, Agent, or Firm* — Knobbe, Martens, Olson & Bear, LLP

(57) ABSTRACT

A vibration damping device comprises: a spindle member through which a shaft portion is inserted, the spindle member being movable along a length direction of the shaft portion; a first coil spring disposed between the spindle member and one end portion of the shaft portion in the length direction, the one end portion of the shaft portion being inserted through the first coil spring, and the first coil spring urging the spindle member toward a side of another end portion of the shaft portion in the length direction; and a second coil spring disposed between the another end portion of the shaft portion and the spindle member, the another end portion of the shaft portion being inserted through the second coil spring, and the second coil spring urging the spindle member toward a side of the one end portion of the shaft portion.

8 Claims, 14 Drawing Sheets

(51) Int. Cl.
   *B60N 2/54* (2006.01)
   *B60N 2/50* (2006.01)
   *F16F 7/116* (2006.01)
   *B60N 2/68* (2006.01)

(52) U.S. Cl.
   CPC ............ *F16F 7/116* (2013.01); *F16F 2222/08* (2013.01); *F16F 2232/08* (2013.01); *F16F 2234/02* (2013.01)

(58) Field of Classification Search
   USPC .............................. 297/216.1–216.2; 267/286
   See application file for complete search history.

(56) References Cited

U.S. PATENT DOCUMENTS

| | | | | |
|---|---|---|---|---|
| 3,761,045 A * | 9/1973 | Sturhan | | B60N 2/502 248/567 |
| 4,195,883 A * | 4/1980 | Ronnhult | | B60N 2/502 248/564 |
| 4,477,050 A * | 10/1984 | Thompson | | B60N 2/502 248/636 |
| 4,718,725 A * | 1/1988 | Suhr | | A47C 1/03222 297/300.3 |
| 4,826,094 A * | 5/1989 | Whiteley | | B65H 54/52 188/282.8 |
| 5,116,016 A * | 5/1992 | Nagata | | B60G 15/063 248/543 |
| 5,570,286 A * | 10/1996 | Margolis | | B60G 13/14 180/165 |
| 6,293,572 B1 * | 9/2001 | Robbins | | B60G 15/063 267/220 |
| 7,185,867 B2 * | 3/2007 | Hill | | B60N 2/502 248/406.2 |
| 8,562,072 B2 * | 10/2013 | Ishimoto | | B60N 2/4228 297/216.12 |
| 2007/0284922 A1 * | 12/2007 | Matsuhashi | | B60N 2/1615 297/216.2 |
| 2014/0292053 A1 * | 10/2014 | Chou | | A47C 3/185 297/344.21 |
| 2017/0219039 A1 * | 8/2017 | Inoue | | F16F 7/1011 |

FOREIGN PATENT DOCUMENTS

| | | |
|---|---|---|
| EP | 2607232 A1 | 6/2013 |
| JP | 2004-116654 | 4/2004 |
| WO | 2013/135076 A1 | 9/2013 |

* cited by examiner

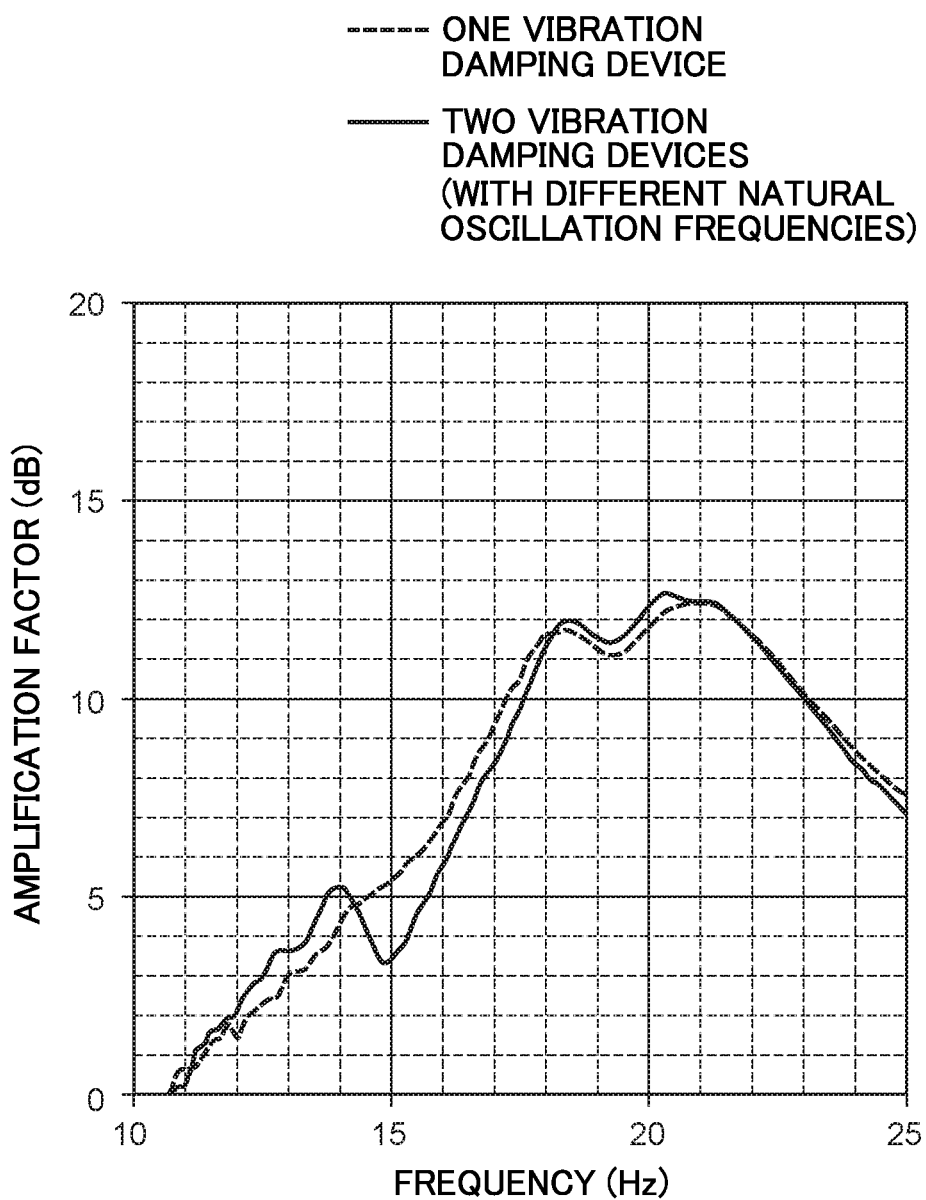

VIBRATION DAMPING DEVICE AND VEHICLE SEAT PROVIDED WITH THE VIBRATION DAMPING DEVICE

CROSS-REFERENCE TO RELATED APPLICATION

This application is based on and claims priority under 35 USC 119 from Japanese Patent Application No. 2016-206366 filed on Oct. 20, 2016, the disclosure of which is incorporated by reference herein.

BACKGROUND

Technical Field

The present invention relates to a vehicle seat.

Related Art

A technology is disclosed in, for example, Japanese Patent Application Laid-Open (JP-A) No. 2004-116654, in which a dynamic damper (a vibration damping device) is provided at a vehicle seat. The dynamic damper is constituted with plural damper masses, adjacent damper masses are connected to one another by a rubber member, and the damper masses are made capable of rocking via the rubber member.

Vibrations during running of an automobile and during idling can be transmitted to a vehicle seat through vehicle body connection portions (seat brackets) that fix the vehicle seat to a vehicle body floor portion.

Consequently, the vehicle seat vibrates. However, when the dynamic damper is provided at the vehicle seat, the damper masses rock when the vehicle seat vibrates, as a result of which the vibrations of the vehicle seat are damped.

In this conventional technology, because the dynamic damper is constituted with plural damper masses and the adjacent damper masses are connected to one another by the rubber member, degrees of freedom when the individual damper masses rock during vibration are high. Thus, it is hard to specify a natural oscillation frequency for the dynamic damper. Consequently, a vibration damping effect in the vehicle seat may not be provided satisfactorily.

Moreover, because the rubber member is used in this dynamic damper, a stroke of the damper masses during vibration is small and vibration damping amounts may not be large. Increasing the masses of the damper masses in order to increase vibration damping amounts can be considered. However, in this case the damper masses become larger and, in correspondence with the amount by which the damper masses become larger, it becomes more difficult to reserve space for disposing the dynamic damper equipped with the dynamic masses in the vehicle seat. In addition, if the masses of the damper masses are increased, there is concern that the vibration damping effect may decline with degradation of the rubber member(s).

SUMMARY

In consideration of the circumstances described above, an object of the present invention is to provide a vibration damping device that may be made compact and lightweight, and a vehicle seat provided with this vibration damping device.

A vibration damping device according to a first aspect includes: a spindle member through which a shaft portion is inserted, the spindle member being movable along a length direction of the shaft portion; a first coil spring disposed between the spindle member and one end portion of the shaft portion in the length direction, the one end portion of the shaft portion being inserted through the first coil spring, and the first coil spring urging the spindle member toward a side of another end portion of the shaft portion in the length direction; and a second coil spring disposed between the another end portion of the shaft portion and the spindle member, the another end portion of the shaft portion being inserted through the second coil spring, and the second coil spring urging the spindle member toward a side of the one end portion of the shaft portion.

In the vibration damping device according to the first aspect, the shaft portion is inserted through the spindle member, and the spindle member is movable along the length direction of the shaft portion. The first coil spring is disposed between the spindle member and one end portion of the shaft portion in the length direction, and the one end portion of the shaft portion is inserted through the first coil spring. The spindle member is urged toward side of another end portion of the shaft portion by the first coil spring in the length direction. The second coil spring is disposed between the another end portion of the shaft portion and the spindle member, and the another end portion of the shaft portion is inserted through the second coil spring. The spindle member is urged toward a side of the one end portion of the shaft portion by the second coil spring.

In the present invention, the spindle member is urged along the length direction of the shaft portion by the first coil spring and the second coil spring. Thus, when the spindle member is moved toward the side of the one end portion of the shaft portion by a vibration caused by a vibrating member, the first coil spring is compressed and the second coil spring is extended, and when the spindle member is moved toward the side of the another end portion of the shaft portion, the first coil spring is extended and the second coil spring is compressed.

As a result, when the spindle member moves, resilient energies (urging forces) are stored in the first coil spring and the second coil spring, and the spindle member is reciprocatingly moved along the length direction of the shaft portion by urging forces from the first coil spring and the second coil spring. That is, vibration energy caused by vibrations of the vibrating member is converted into kinetic energy of the spindle member moving. Thus, the vibration energy is absorbed and the vibrations of the vibrating member are damped.

In the present invention, the spindle member is subject to "forced vibrations" in which urging forces from the first coil spring and the second coil spring act on the spindle member therebetween. Therefore, a natural oscillation frequency of the spindle member may be set to a resonance frequency of the vibrating member. Hence, vibrations of the vibrating member may be damped effectively.

In the present invention, the first coil spring and the second coil spring are employed as urging members that urge the spindle member. Therefore, a stroke of the spindle member may be made longer than in a structure in which a rubber member is used as an urging member. Thus, the kinetic energy of movements of the spindle member may be increased. Therefore, according to the vibration damping device of the present invention, the vibration damping device may be made more compact and lightweight.

In the present invention, the first coil spring, the spindle member and the second coil spring are movable along the length direction of the shaft portion. In other words, the first coil spring, the spindle member and the second coil spring have freedom of movement in one direction. Therefore, a natural oscillation frequency may be specified easily for the vibration damping device of the present invention.

In a vibration damping device according to a second aspect, in the vibration damping device of the first aspect, an outer side of the shaft portion is covered with a collar member fabricated of resin, the collar member being disposed between the shaft portion and the spindle member, first coil spring and second coil spring.

In the vibration damping device according to the second aspect, because the outer side of the shaft portion is covered with the collar member fabricated of resin, the shaft portion is not exposed to the exterior. That is, the collar member is disposed between the shaft portion and the spindle portion, first coil spring and second coil spring. Therefore, even if the shaft portion, spindle portion, first coil spring and second coil spring that are employed are fabricated of metal, the shaft portion does not come into direct contact with the spindle member, the first coil spring and the second coil spring. As a result, the generation of noises by the metal members interfering with one another may be prevented.

A vehicle seat according to a third aspect includes a seat main body that includes: a sitting portion on which a vehicle occupant sits; a seat back that supports an upper body of the vehicle occupant sitting on the sitting portion; and a headrest that is provided at the upper side of the seat back and supports a head area of the vehicle occupant. In this vehicle seat, the vehicle damping device is provided at the seat back or the headrest.

In general, a seat main body is attached to a vehicle body floor portion, via sliding rails and seat brackets, to be slidable in a vehicle front-and-rear direction. Thus, because the lower end side of the seat main body is supported by the slide rails, the seat back or headrest side of the seat main body acts as a free end side and has larger vibrations than vibrations of a seat cushion side.

Accordingly, in the vehicle seat of the third aspect, the vibration damping device is provided at the seat back or headrest that has larger vibrations than the seat cushion side. Therefore, vibration energy of the seat main body is absorbed effectively and vibration damping to damp vibrations of the seat main body may be improved.

In a vehicle seat according to a fourth aspect, in the vehicle seat of the third aspect, a spring constant $K_1$ of the first coil spring and a spring constant $K_2$ of the second coil spring are set such that a natural oscillation frequency of the spindle member is the same as a resonance frequency of the seat main body.

In the vehicle seat of the fourth aspect, because the spring constant $K_1$ of the first coil spring and the spring constant $K_2$ of the second coil spring are set such that the natural oscillation frequency of the spindle member is the same as the resonance frequency of the seat main body, the spindle member resonates via the first coil spring and the second coil spring during resonance of the seat main body. Therefore, vibration energy of the seat main body is converted to kinetic energy of the spindle member, the vibration energy of the seat main body is absorbed, and vibrations of the seat main body are damped effectively.

In a vehicle seat according to a fifth aspect, in the vehicle seat of the third aspect or the fourth aspect, the vibration damping device is provided at an upper end side of a seat back frame that structures a framework of the seat back.

In correspondence with an amount by which an external profile of the seat back is larger than that of the headrest, it is easier to reserve space to dispose the vibration damping device in the seat back. Therefore, in the vehicle seat according to the fifth aspect, the vibration damping device may be provided at the upper end side of the seat back frame structuring the framework of the seat back. Thus, space for disposition of the vibration damping device may be satisfactorily assured.

In a vehicle seat according to a sixth aspect, in the vehicle seat of any one of the third to fifth aspects, the vibration damping device is arranged along a seat width direction.

In the vehicle seat of the sixth aspect, damping may be applied to vibrations of the seat main body in the seat width direction.

In a vehicle seat according to a seventh aspect, in the vehicle seat of any one of the third to sixth aspects, the vibration damping device is arranged along a seat front-and-rear direction.

In the vehicle seat of the seventh aspect, damping may be applied to vibrations of the seat main body in the seat front-and-rear direction.

In a vehicle seat according to an eighth aspect, in the vehicle seat of any one of the third to seventh aspects, the vibration damping device is arranged to include components in the seat width direction, the seat front-and-rear direction and a seat up-and-down direction.

In the vehicle seat of the eighth aspect, damping may be applied to vibrations of the seat main body in the seat width direction, the seat front-and-rear direction and the seat up-and-down direction.

According to the vibration damping device of the first aspect, the vibration damping effect may be improved and the vibration damping device may be made more compact and lightweight.

According to the vibration damping device of the second aspect, the generation of noises by metal members interfering with one another may be prevented.

According to the vehicle seat of the third aspect, vibration energy of the seat main body may be effectively absorbed, the damping effect to damp vibrations of the seat main body may be improved, and the vehicle seat may be made more compact and lightweight.

According to the vehicle seat of the fourth aspect, vibration energy of the seat main body may be reliably absorbed and vibrations of the seat main body may be damped.

According to the vehicle seat of the fifth aspect, freedom of design for arranging the vibration damping device is raised.

According to the vehicle seat of the sixth aspect, vibrations of the seat main body in the seat width direction may be damped.

According to the vehicle seat of the seventh aspect, vibrations of the seat main body in the seat front-and-rear direction may be damped.

According to the vehicle seat of the eighth aspect, vibrations of the seat main body that include components in the seat width direction, the seat front-and-rear direction and the seat up-and-down direction may be damped.

BRIEF DESCRIPTION OF THE DRAWINGS

Exemplary embodiments of the present invention will be described in detail based on the following figures, wherein:

FIG. 14 is a graph showing relationships between frequency and amplification factor, for describing effects of the vibration damping device of the vehicle seat according to the present exemplary embodiment.

DETAILED DESCRIPTION

Figure 1:
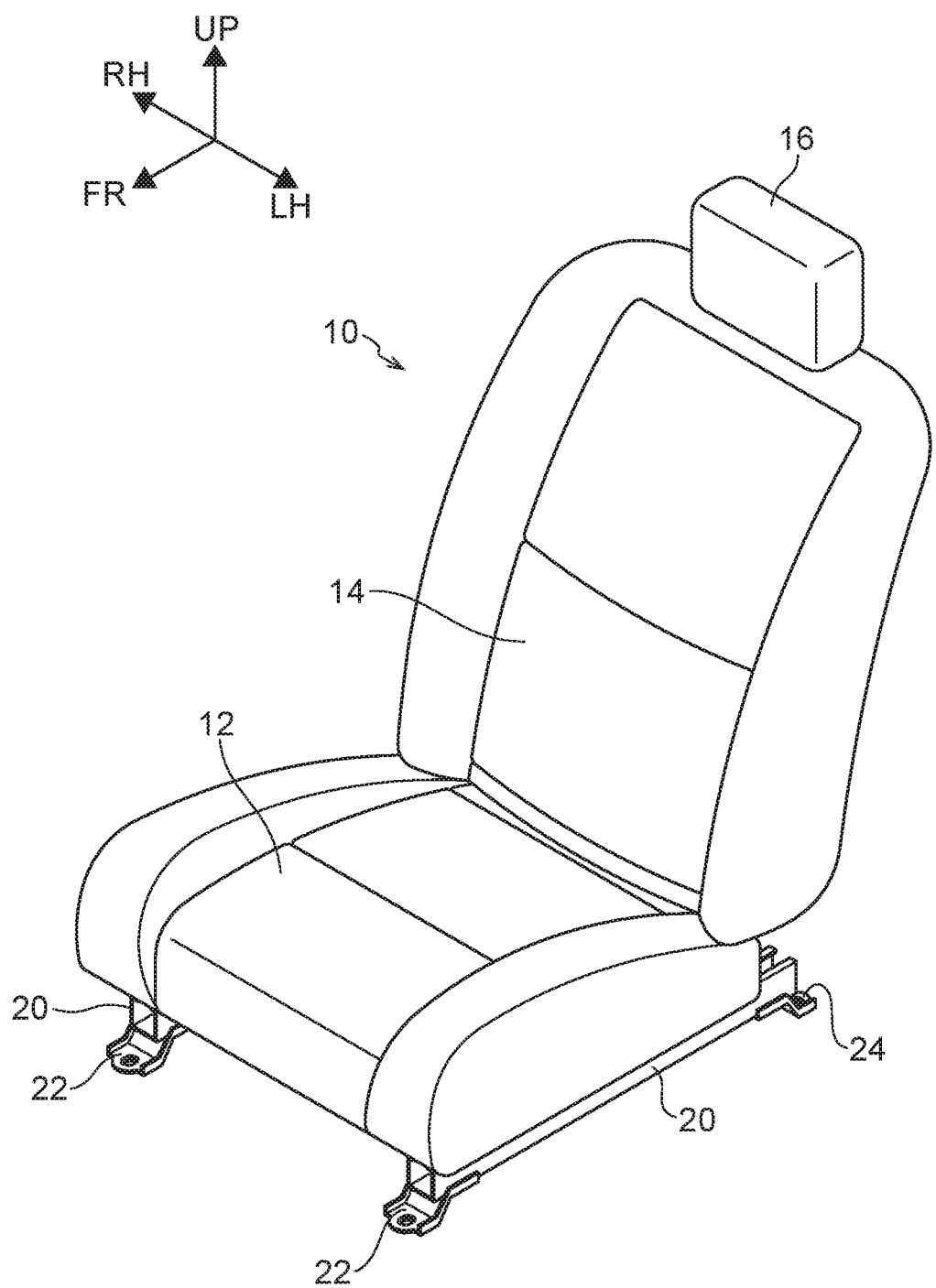
FIG. 1 is a perspective view of a vehicle seat according to a present exemplary embodiment, seen diagonally from the front-left of the seat.

Herebelow, a vehicle seat 10 according to a present exemplary embodiment is described using the attached drawings. The arrow FR that is shown where appropriate in the drawings indicates a front direction of the vehicle seat (a direction in which a seat occupant faces), the arrow UP indicates an upper direction of the vehicle seat, an arrow RH indicates a right direction of the vehicle seat and an arrow LH indicates a left direction of the vehicle seat. Herebelow, where descriptions are given simply using the directions front, rear, up, down, left and right, unless otherwise specified, these represent front and rear of the vehicle seat, up and down of the vehicle seat, and left and right of the vehicle seat when facing in a progress direction.

—Structure of the Vehicle Seat—

First, the structure of the vehicle seat according to the exemplary embodiment is described.

As shown in FIG. 1, the vehicle seat (seat main body) 10 includes a seat cushion (sitting portion) 12 on which a vehicle occupant sits, a seat back 14 that supports the upper body of the vehicle occupant, and a headrest 16 that is provided at the upper side of the seat back and supports the head area of the vehicle occupant.

Figure 2:
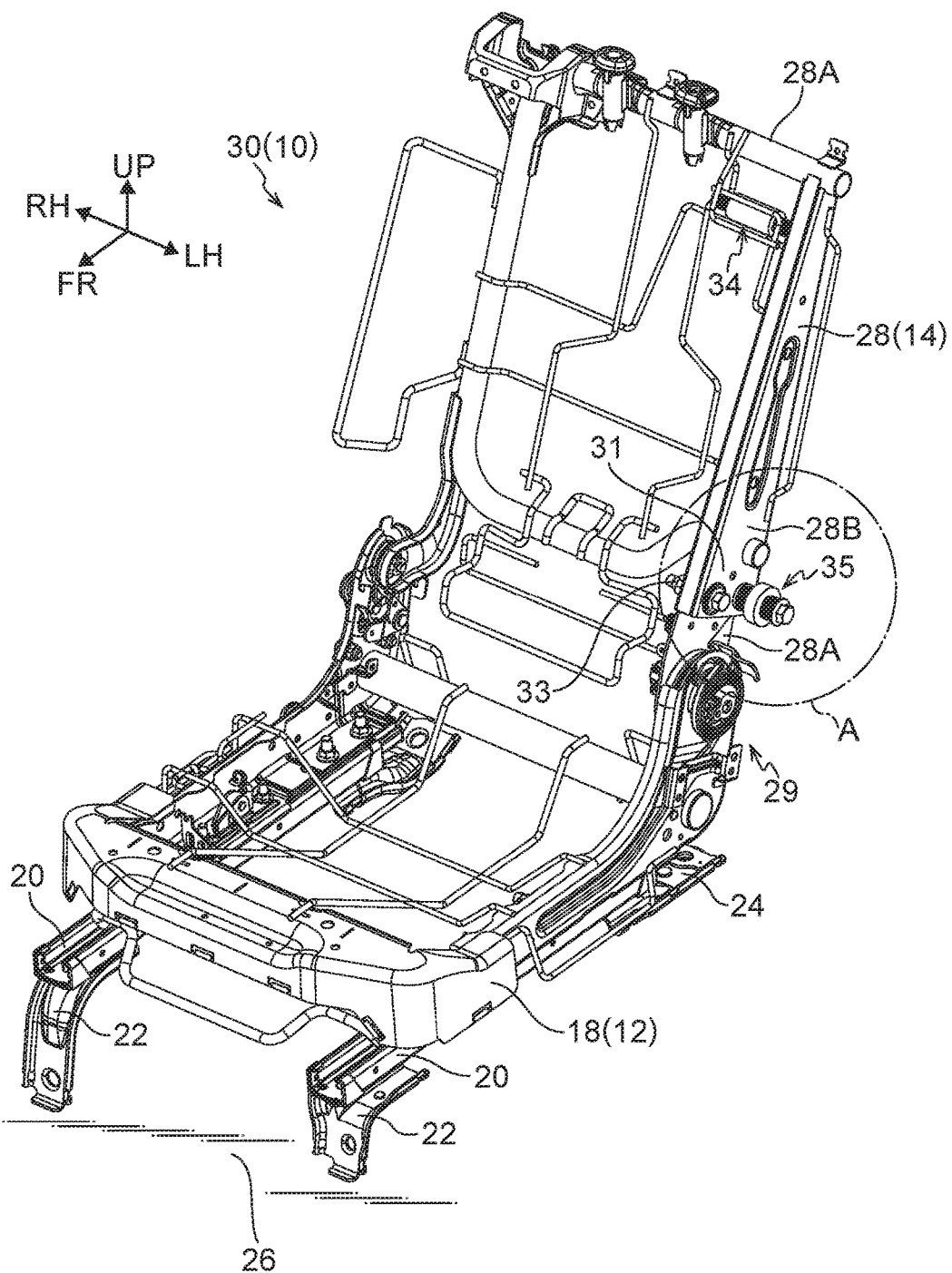
FIG. 2 is a perspective view of a seat main body of the vehicle seat according to the present exemplary embodiment, seen diagonally from the front-left of the seat.

The seat cushion 12 is formed of, for example, a foam body such as a urethane pad or the like, and is fixed to a cushion frame 18, which is shown in FIG. 2. FIG. 2 is a perspective view in which a seat main body 30 is seen from the front-left side. The seat main body 30 includes the cushion frame 18 and a seat back frame 28, which is described below. The headrest 16 shown in FIG. 1 is not shown in FIG. 2. The headrest 16 that is shown in FIG. 1 is not shown in FIG. 3, similarly to FIG. 2.

As shown in FIG. 2, sliding rails 20 are provided along the seat front-and-rear direction at the lower side of two seat width direction end sides of the cushion frame 18. The pair of left and right sliding rails 20 are fixed to a vehicle body floor portion 26 via front side seat brackets 22, which are provided at respective front portions of the sliding rails 20, and rear side seat brackets 24, which are provided at respective rear portions of the sliding rails 20. The vehicle seat 10 is made slidable in the vehicle front-and-rear direction via the pair of left and right sliding rails 20.

Figure 8:
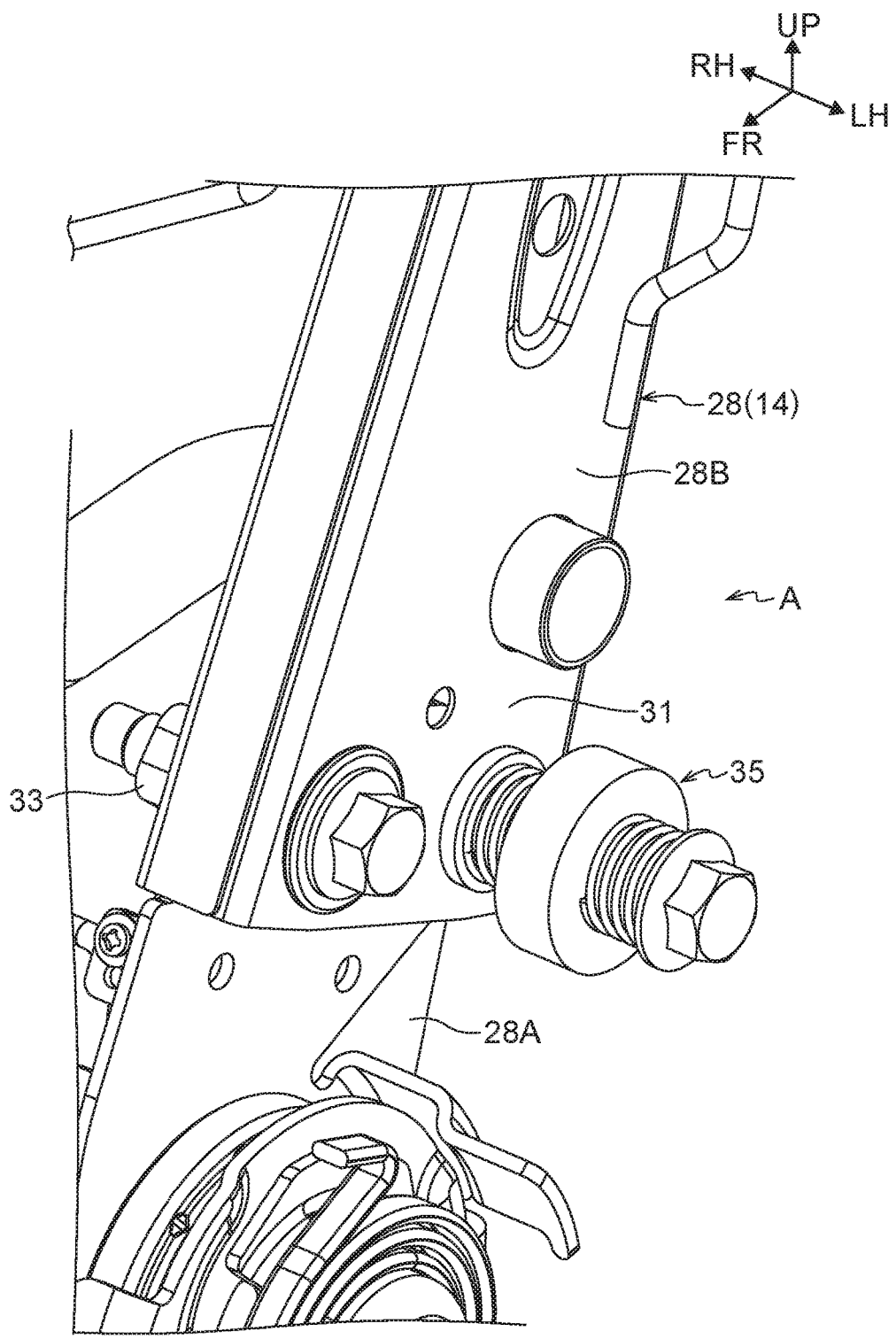
FIG. 8 is a partial enlarged perspective view in which area A in FIG. 2 is enlarged, showing a first variant example in a state in which a vibration damping device according to the present exemplary embodiment is disposed in a region at the lower portion side of the seat back frame.

Similarly to the seat cushion 12, the seat back 14 is formed of, for example, a foam body such as a urethane pad or the like. The seat back 14 is fixed to the seat back frame 28 shown in FIG. 2. The seat back frame 28 includes a lower frame 25 and an upper frame 27. A reclining device 29 that is capable of tilting the seat back frame 28 in the vehicle front-and-rear direction relative to the cushion frame 18 is provided at the lower frame 25. The headrest 16 is connected to the upper frame 27. As shown in FIG. 8, the lower frame 25 and upper frame 27 are connected via plural bolts 33 at a fastening region 31, which is disposed at a lower portion side of the seat back frame 28.

Figure 3:
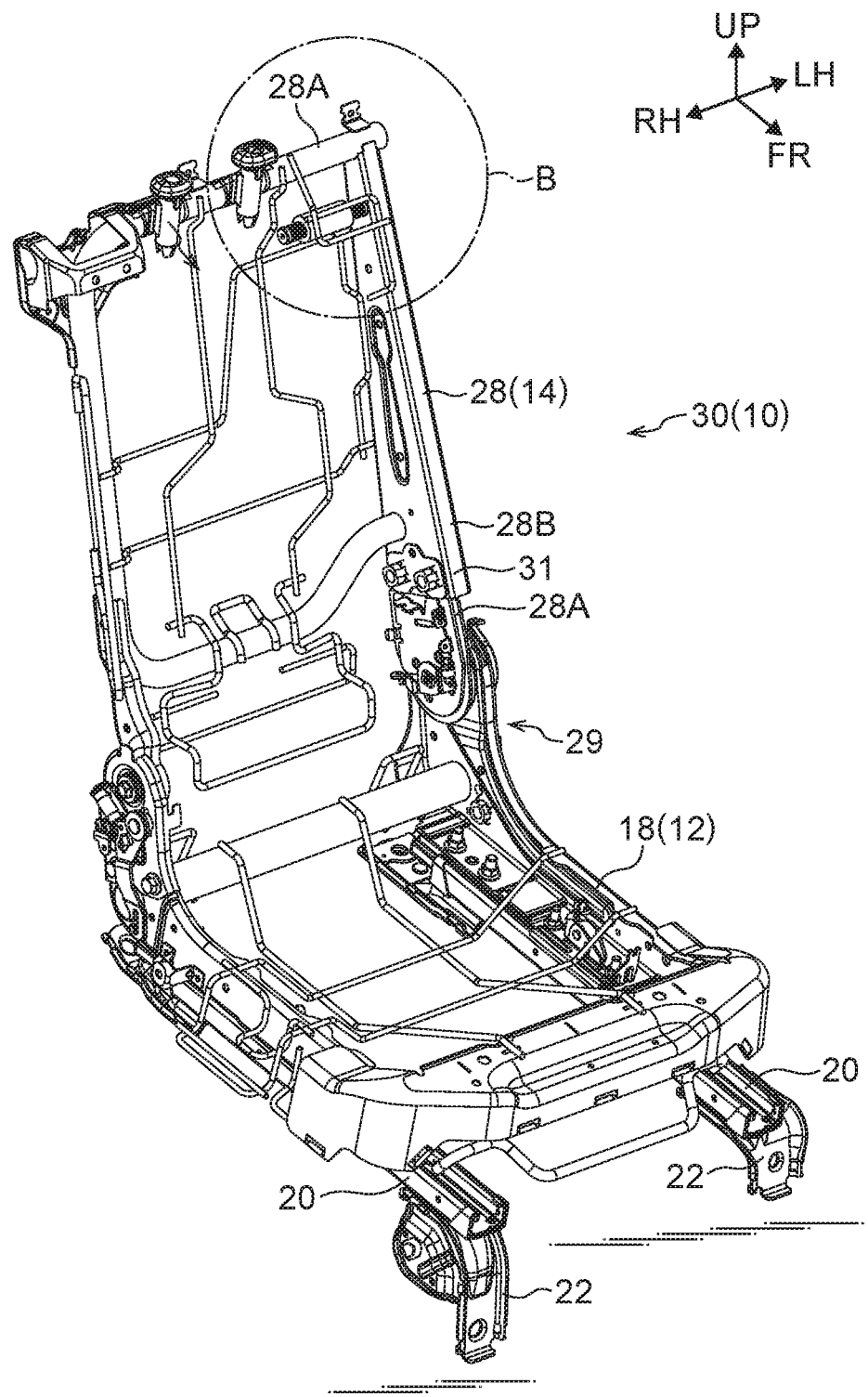
FIG. 3 is a perspective view of the seat main body of the vehicle seat according to the present exemplary embodiment, seen diagonally from the front-right of the seat.
Figure 4:
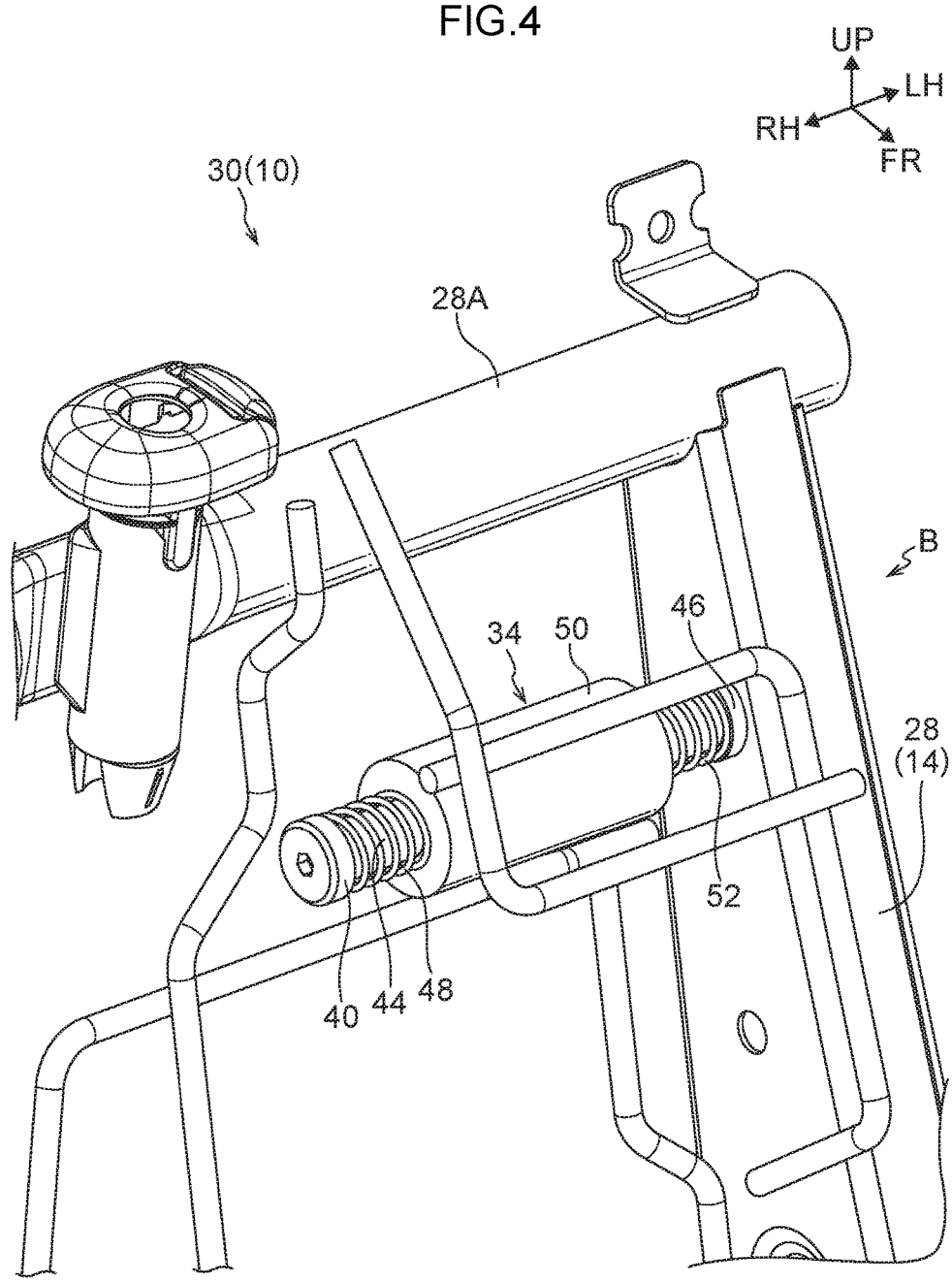
FIG. 4 is a partial enlarged perspective view in which area B in FIG. 3 is enlarged, showing a state in which a vibration damping device according to the present exemplary embodiment is disposed in a region at the upper end side at the left side of a seat back frame.

FIG. 8 shows a partial enlarged perspective view in which the fastening region 31 (area A) of the seat back frame 28 shown in FIG. 2 is magnified. FIG. 3 is a perspective view in which the seat main body 30 shown in FIG. 2 is seen diagonally from the front-right of the seat. FIG. 4 shows a partial enlarged perspective view in which a region (area B) at the upper end side at the left side of the seat back frame 28 shown in FIG. 3 is magnified.

In the present exemplary embodiment, as shown in FIG. 4, a vibration damping device 34 is attached by welding or the like to an upper end 28A side of the seat back frame 28. In the state in which the vibration damping device 34 is attached to the upper end 28A side of the seat back frame 28, the vibration damping device 34 is arranged along the seat width direction of the vehicle seat 10.

—Structure of Vibration Damping Device—Now, the structure of the vibration damping device 34 is described.

Figure 5:
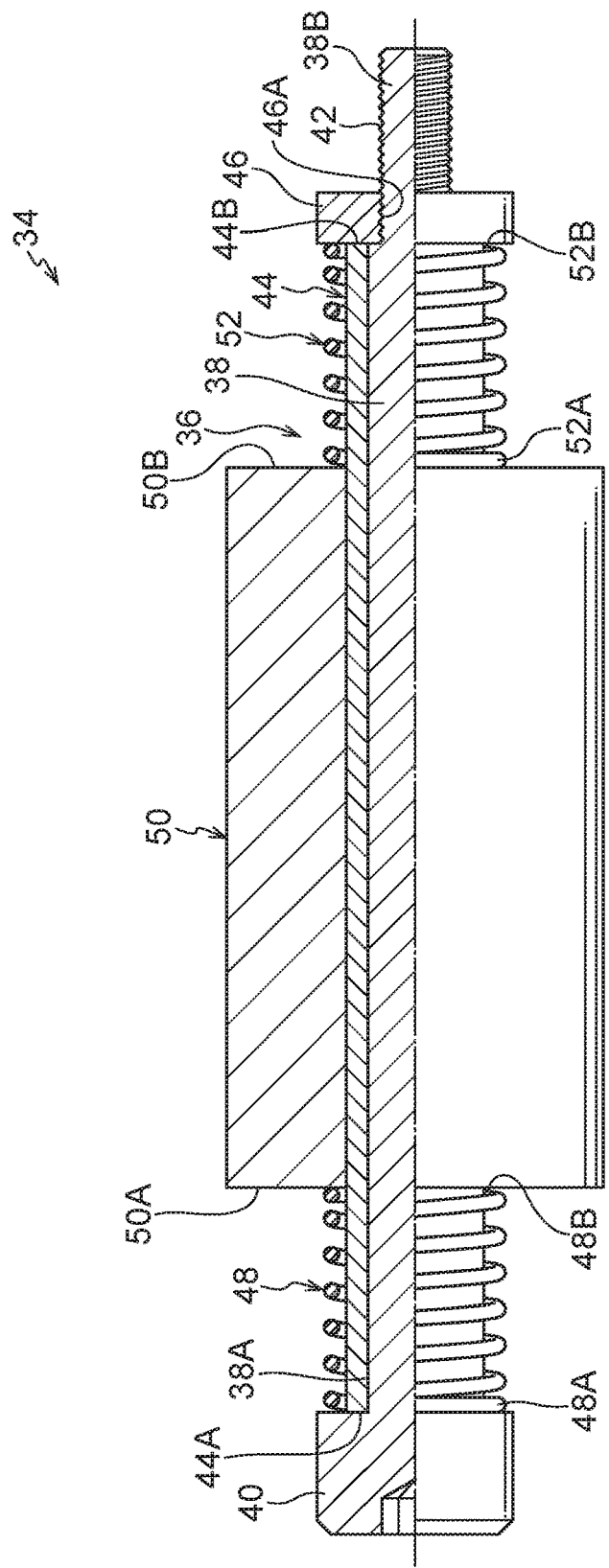
FIG. 5 is a partial sectional diagram in which the vibration damping device according to the present exemplary embodiment is seen in a front view.
Figure 6:
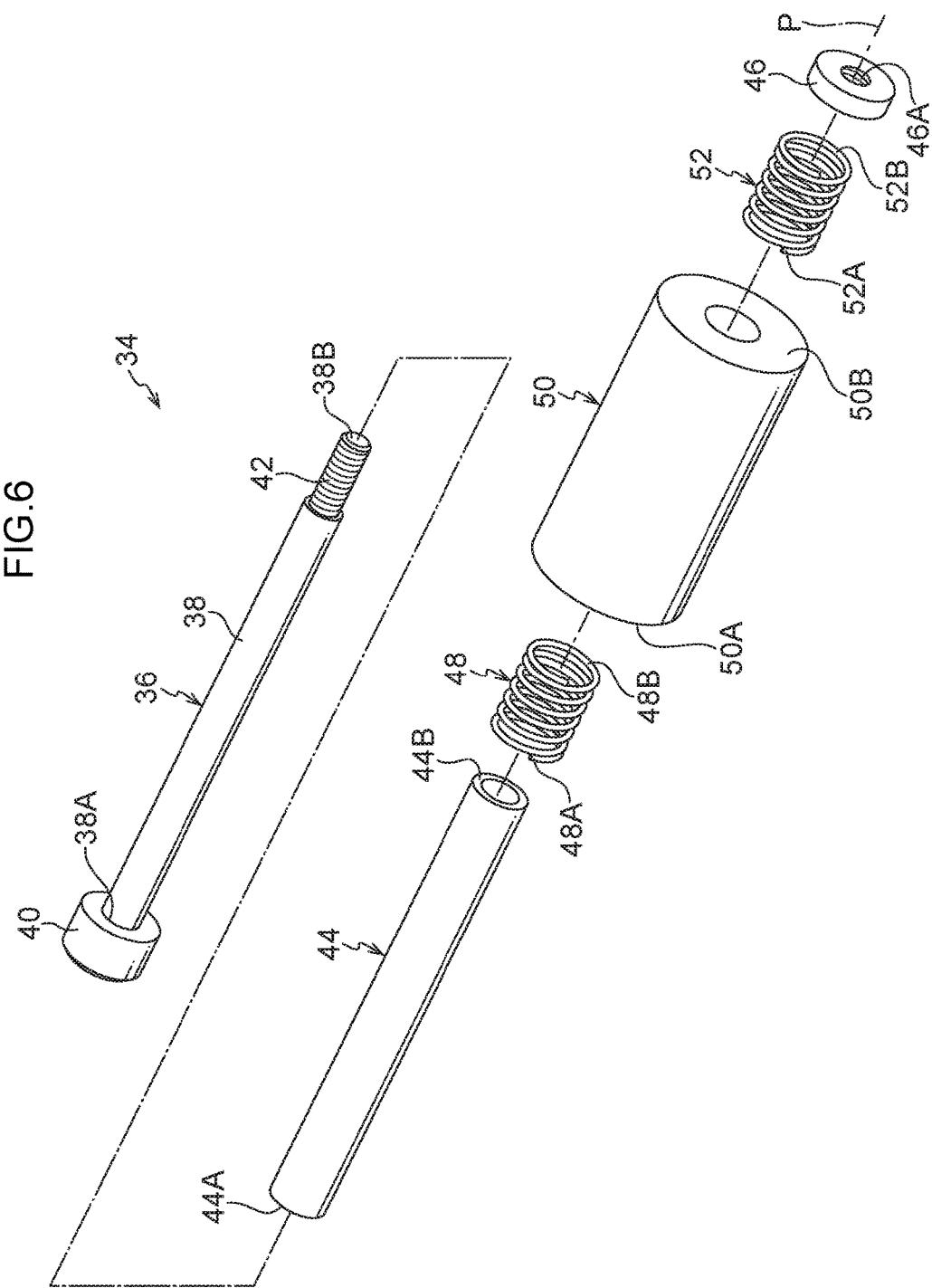
FIG. 6 is an exploded perspective view showing structures of the vibration damping device according to the present exemplary embodiment.

As shown in FIG. 5 and FIG. 6, the vibration damping device 34 according to the present exemplary embodiment is equipped with a stepped bolt (shaft portion) 36 fabricated of metal. The stepped bolt 36 includes a shaft portion 38, a head portion 40 provided at a length direction one end portion 38A of the shaft portion 38 (below referred to as the one end portion 38A of the shaft portion 38), and a male thread portion 42 provided at a length direction another end portion 38B of the shaft portion 38 (below referred to as the another end portion 38B of the shaft portion 38).

The outer side of the shaft portion 38 is covered with a circular tube-shaped collar 44 fabricated of resin. One end portion 44A of the length direction of the collar 44 is abutted against the head portion 40 of the stepped bolt 36. The collar 44 is formed to be a little shorter than the shaft portion 38. The collar 44 is specified such that, in the state in which the shaft portion 38 is covered with the collar 44, the male thread portion 42 of the stepped bolt 36 is exposed to the exterior.

At the outer side of the shaft portion 38 and the collar 44, a coil spring (a first coil spring) 48, a spindle member 50, and a coil spring (a second coil spring) 52 are arranged in this order along the length direction of the collar 44 from the side at which the one end portion 38A of the shaft portion 38 is disposed (the side at which the head portion 40 of the stepped bolt 36 is disposed). The coil spring 48, the spindle member 50 and the coil spring 52 are each formed of metal. The spindle member 50 is formed in a circular rod shape. The shaft portion 38 of the stepped bolt 36 and the collar 44 are inserted through the axial centers of the coil spring 48, the spindle member 50 and the coil spring 52.

In other words, the collar 44 is disposed between the shaft portion 38 and the coil spring 48, spindle member 50 and coil spring 52. One end portion 48A of the coil spring 48 abuts against the head portion 40 of the stepped bolt 36, and another end portion 48B of the coil spring 48 abuts against one end 50A of the spindle member 50. Another end 50B of the spindle member 50 abuts against one end portion 52A of the coil spring 52.

As described above, the male thread portion 42 of the stepped bolt 36 is specified so as to be exposed to the exterior. A female thread portion 46A is formed at a provisional retention member 46 with an annular shape. Accordingly, the provisional retention member 46 can be screwed onto the male thread portion 42 of the stepped bolt 36. Another end portion 44B of the length direction of the collar 44 and another end portion 52B of the coil spring 52 abut against this provisional retention member 46. Thus, the collar 44 and the coil spring 52 are retained on the shaft portion 38.

In the state in which the coil spring 48, the spindle member 50 and the coil spring 52 are disposed at the outer side of the shaft portion 38 and the collar 44 as described above, the coil spring 48, the spindle member 50 and the coil spring 52 are movable along the length direction relative to the collar 44.

The spindle member 50 is urged toward the side at which the another end portion 38B of the shaft portion 38 is disposed (the side at which the male thread portion 42 of the stepped bolt 36 is disposed) by the coil spring 48, and is urged toward the side at which the one end portion 38A of the shaft portion 38 is disposed by the coil spring 52. That is, resilient energies (urging forces) are stored in the coil spring 48 and the coil spring 52. As a result, the spindle member 50 is disposed at a substantially central region of the length direction of the shaft portion 38.

In the present exemplary embodiment, a spring constant $K_1$ of the coil spring 48 and a spring constant $K_2$ of the coil spring 52 are set such that a natural oscillation frequency of the spindle member 50 is the same as a resonance frequency of the vehicle seat 10.

—Operation and Effects of the Vehicle Seat—Now, operation and effects of the vehicle seat according to the present exemplary embodiment are described.

As shown in FIG. 3 to FIG. 6, in the present exemplary embodiment the vibration damping device 34 is constituted with the shaft portion 38 of the stepped bolt 36, the coil spring 48, the spindle member 50 and the coil spring 52. The shaft portion 38 of the stepped bolt 36 is inserted through the spindle member 50, the coil spring 48 is provided at the side of the shaft portion 38 at which the one end portion 38A is disposed, and the coil spring 52 is provided at the side of the shaft portion 38 at which the another end portion 38B is disposed, with the spindle member 50 between the coil spring 48 and the coil spring 52. The spindle member 50 is urged by the coil spring 48 toward the side of the shaft portion 38 at which the another end portion 38B is disposed, and the spindle member 50 is urged by the coil spring 52 toward the side of the shaft portion 38 at which the one end portion 38A is disposed.

Consequently, when the spindle member 50 is moved toward the side of the shaft portion 38 at which the one end portion 38A is disposed by a vibration of the vehicle seat 10 (an external vibration), the coil spring 48 is compressed while the coil spring 52 is extended, and when the spindle member 50 is moved toward the side of the shaft portion 38 at which the another end portion 38B is disposed, the coil spring 48 is extended while the coil spring 52 is compressed.

Therefore, when the spindle member 50 moves, respective resilient energies (urging forces) are stored in the coil spring 48 and the coil spring 52, and the spindle member 50 is reciprocatingly moved along the length direction of the shaft portion 38 by urging forces from the coil spring 48 and the coil spring 52. In other words, vibration energy from vibrations of the vehicle seat 10 is converted into kinetic energy of the spindle member 50 moving. As a result, the vibration energy is absorbed and the vibrations of the vehicle seat 10 are damped.

Figure 7:
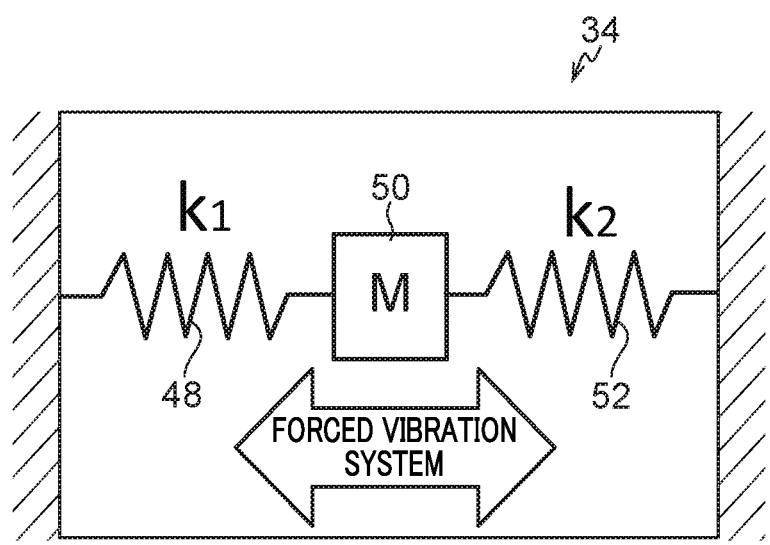
FIG. 7 is a schematic diagram showing a vibration model of the vibration damping device according to the present exemplary embodiment.

In the present exemplary embodiment, as illustrated in FIG. 7, the spindle member 50 is subject to "forced vibrations" in which urging forces from the coil spring 48 and the coil spring 52 act on the spindle member 50 therebetween. Therefore, consequent to the natural oscillation frequency of the spindle member 50 being set to a resonance frequency of the vehicle seat 10 (see FIG. 3), vibrations of the vehicle seat 10 may be damped effectively.

In specific terms, the spring constant $K_1$ of the coil spring 48 and the spring constant $K_2$ of the coil spring 52 are set such that the natural oscillation frequency of the spindle member 50 is the same as the resonance frequency of the vehicle seat 10. For example, in free vibration, if the mass of the spindle member 50 is represented by M and a spring constant of the spindle member 50 is represented by K, a frequency f of the spindle member 50 (the natural oscillation frequency) is found from Expression (1). In the present exemplary embodiment, because the vibration is forced vibration, a natural oscillation frequency f of the spindle member 50 is found from Expression (2). That is, the spring constant $K_1$ of the coil spring 48 and the spring constant $K_2$ of the coil spring 52 are specified such that the natural oscillation frequency f of the spindle member 50 is set to the resonance frequency of the vehicle seat 10 (see FIG. 3).

$$M = \text{MASS (kg)} \quad \text{Expression (1)}$$
$$k = \text{SPRING CONSTANT (N/m)}$$
$$f = \text{FREQUENCY (Hz)}$$
$$f = \frac{1}{2\pi}\sqrt{\frac{k}{M}}$$

SPRING CONSTANT $k = k_1 + k_2$, therefore, $$f = \frac{1}{2\pi}\sqrt{\frac{k_1 + k_2}{M}} \quad \text{Expression (2)}$$

Therefore, during vibrations of the vehicle seat 10 (see FIG. 3), the spindle member 50 resonates via the coil spring 48 and the coil spring 52, and vibration energy of the vehicle seat 10 is converted into kinetic energy of the spindle member 50. Consequently, as described above, the vibration energy of the vehicle seat 10 is absorbed and the vibrations of the vehicle seat 10 are damped effectively.

In the present exemplary embodiment, as shown in FIG. 5 and FIG. 6, the coil spring 48 and the coil spring 52 are employed as urging members that urge the spindle member 50. Therefore, although not shown in the drawings, a stroke of the spindle member 50 may be made longer than in a structure in which a rubber member is employed as an urging member. Thus, the kinetic energy of movements of the spindle member 50 may be increased. Therefore, the vibration damping device 34 according to the present exemplary embodiment may be made more compact and lightweight, with a simple structure.

In the present exemplary embodiment, the coil spring 48, the spindle member 50 and the coil spring 52 are movable along the length direction of the shaft portion 38. That is, the coil spring 48, spindle member 50 and coil spring 52 have freedom of movement in one direction. Therefore, the natural oscillation frequency of the vibration damping device 34 according to the present exemplary embodiment may be set easily.

In the present exemplary embodiment, the collar 44 is disposed between the shaft portion 38 and the coil spring 48, spindle member 50 and coil spring 52. Therefore, even though the shaft portion 38, coil spring 48, spindle member 50 and coil spring 52 that are fabricated of metal are employed, the shaft portion 38 does not make direct contact with the coil spring 48, spindle member 50 and coil spring 52.

As a result, the generation of noises by the metal members interfering with one another may be prevented. In addition, because the spindle member 50 and coil springs 48 and 52 structuring the vibration damping device 34 are each formed of metal, the effects of temperature are less than in, for example, a structure in which these components are formed of resin.

As shown in FIG. 1 and FIG. 2, the vehicle seat 10 is attached to the vehicle body floor portion 26 via the sliding rails 20, the front side seat brackets 22 and the rear side seat brackets 24. Therefore, the side of the vehicle seat 10 at which the seat back 14, and headrest 16 are provided acts as a free end side, at which vibrations are larger than vibrations at the side of the vehicle seat 10 at which the seat cushion 12 is provided.

Accordingly, in the present exemplary embodiment the vibration damping device 34 is provided at the side of the seat back frame 28 of the vehicle seat 10 at which the upper end 28A is disposed. In the vehicle seat 10, because the vibration damping device 34 is provided at the seat back 14 or headrest 16 at which vibrations are larger, vibration energy of the vehicle seat 10 may be absorbed effectively and the damping effect to damp the vehicle seat 10 may be improved.

In the present exemplary embodiment, as described above, the vibration damping device 34 is provided at the side of the seat back frame 28 of the vehicle seat 10 at which the upper end 28A is disposed. The external profile of the seat back 14 is larger than that of the headrest 16 or the seat cushion 12, and is larger than the external profile of the seat back frame 28 forming the framework by a corresponding amount. Therefore, because the vibration damping device 34 is disposed at the seat back frame 28, space for disposition of the vibration damping device 34 may be satisfactorily assured.

In the present exemplary embodiment, the vibration damping device 34 is arranged along the seat width direction of the vehicle seat 10 at the side of the seat back frame 28 at which the upper end 28A is disposed. Therefore, the vibration damping device 34 may damp vibrations of the vehicle seat 10 in the seat width direction.

—Variant Examples of the Present Exemplary Embodiment—

In the present exemplary embodiment, as shown in FIG. 2, the vibration damping device 34 is provided at the side of the seat back frame 28 of the vehicle seat 10 at which the upper end 28A is disposed, but this is not a limitation.

As described above, the upper frame 27 and lower frame 25 of the seat back frame 28 are fastened at the fastening region 31 via the bolts 33. The vibration damping device 34 includes the stepped bolt 36 as shown in FIG. 6. Accordingly, by using the stepped bolt 36, for example, a vibration damping device 35 according to the present invention may be employed instead of one of the bolts 33, as shown in FIG. 8 (a first variant example). In this configuration, as shown in FIG. 2, it may not be possible to satisfactorily assure space for disposition of the vibration damping device 35, in contrast to the vibration damping device 34.

Figure 11:
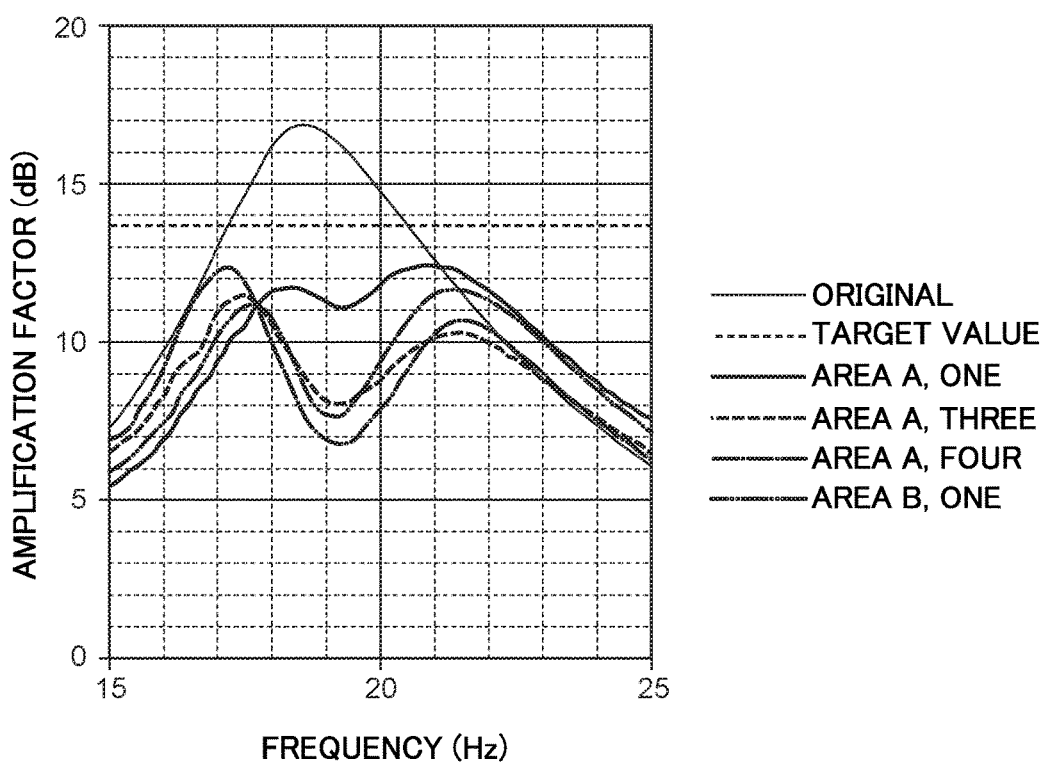
FIG. 11 is a graph showing relationships between frequency and amplification factor, for describing effects of the vibration damping device of the vehicle seat according to the present exemplary embodiment.

The graph in FIG. 11 shows relationships between frequency and amplification factor in the vehicle seat 10 (see FIG. 1). Thus, vibrations of the vehicle seat 10 at particular frequencies can be understood. A vehicle seat in which the vibration damping device 34 according to the present exemplary embodiment is not provided is represented by the solid line marked "original" in the graph of FIG. 11.

A structure in which one of the vibration damping device 34 is provided at the side of the seat back frame 28 of the vehicle seat 10 at which the upper end 28A is disposed (area B), as shown in FIG. 3 and FIG. 4, is represented by a two dot-chain line marked "area B, one" in the graph of FIG. 11.

For comparison, a structure in which one of the vibration damping device 35 is provided at the lower portion side of the seat back frame 28 (area A), as shown in FIG. 2 and FIG. 8, is represented by a heavy line marked "area A, one" in the graph of FIG. 11.

As can be seen from the graph of FIG. 11, providing the vibration damping device 34 at the upper portion side of the seat back frame 28 rather than the lower portion side (see FIG. 2) in the vehicle seat 10 may reduce the amplification factor in the vehicle seat 10 at particular frequencies. That is, in the vehicle seat 10, providing the vibration damping device 34 at the upper portion side rather than the lower portion side of the seat back frame 28 enhances the damping effect to damp vibrations of the vehicle seat 10.

Figure 9:
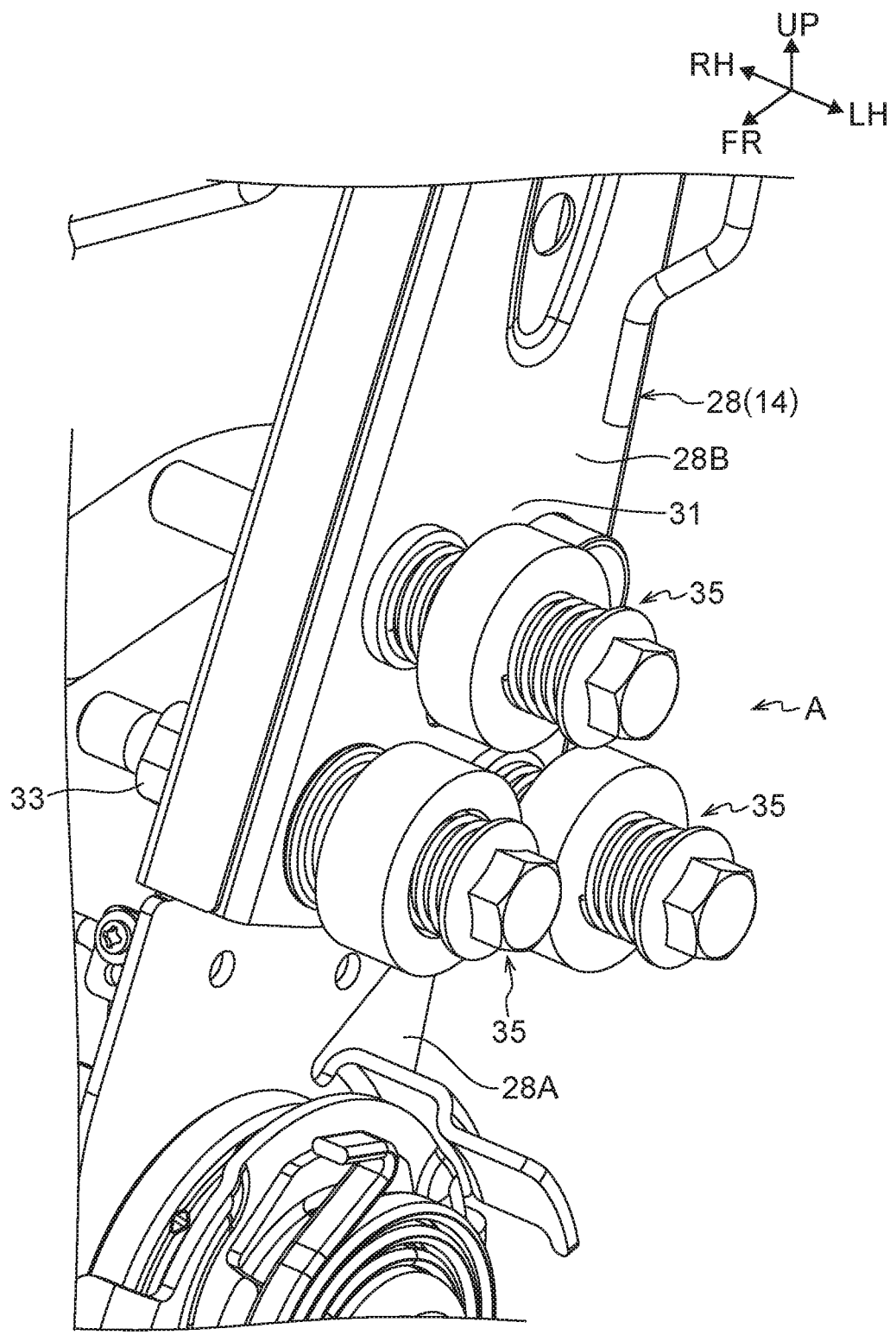
FIG. 9 is a partial enlarged perspective view, corresponding to FIG. 8, showing a second variant example of the vehicle seat according to the present exemplary embodiment.
Figure 10:
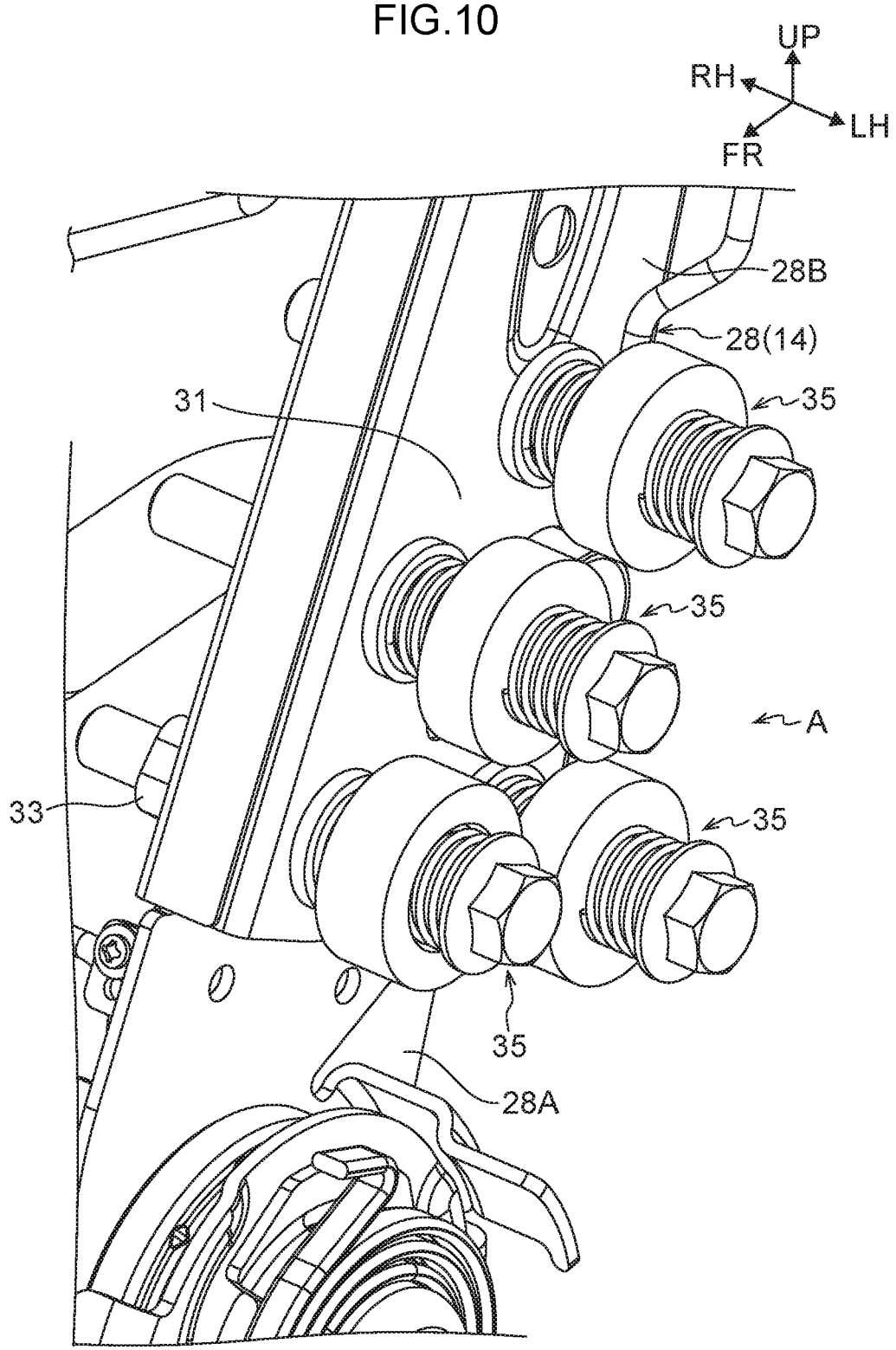
FIG. 10 is a partial enlarged perspective view, corresponding to FIG. 8, showing a third variant example of the vehicle seat according to the present exemplary embodiment.

As further examples, FIG. 9 shows an example (a second variant example) in which three of the vibration damping device 35 are provided at the fastening region 31 (area A) of the seat back frame 28 of the vehicle seat 10, and FIG. 10 shows an example (a third variant example) in which four of the vibration damping device 35 are provided in area A. The structure in which the three vibration damping devices 35 are provided in area A is represented by a dotted line marked "area A, three" in the graph of FIG. 11, and the structure in which the four vibration damping devices 35 are provided in area A is represented by a two-dot chain line marked "area A, four".

As can be seen from the graph of FIG. 11, providing the one vibration damping device 34 in area B reduces amplification factor and enhances the damping effect compared to providing the four vibration damping devices 35 in area A. Therefore, a structure in which the vibration damping device 34 is provided at the upper end side of the seat back frame 28 of the vehicle seat 10, as shown in FIG. 3 and FIG. 4, may easily provide the effects of a structure in which a plural number of the vibration damping devices 35 are provided at the lower portion side of the seat back frame 28 of the vehicle seat 10, as shown in FIG. 2 and FIG. 8. That is, providing the vibration damping device 34 at the upper portion side rather than the lower portion side of the seat back frame 28 may more effectively provide the damping effect to damp vibrations of the vehicle seat 10.

As described above, in the present exemplary embodiment, the vibration damping device 34 is arranged along the seat width direction of the vehicle seat 10 at the side of the seat back frame 28 at which the upper end 28A is disposed, but this arrangement direction is not a limitation.

Figure 12:
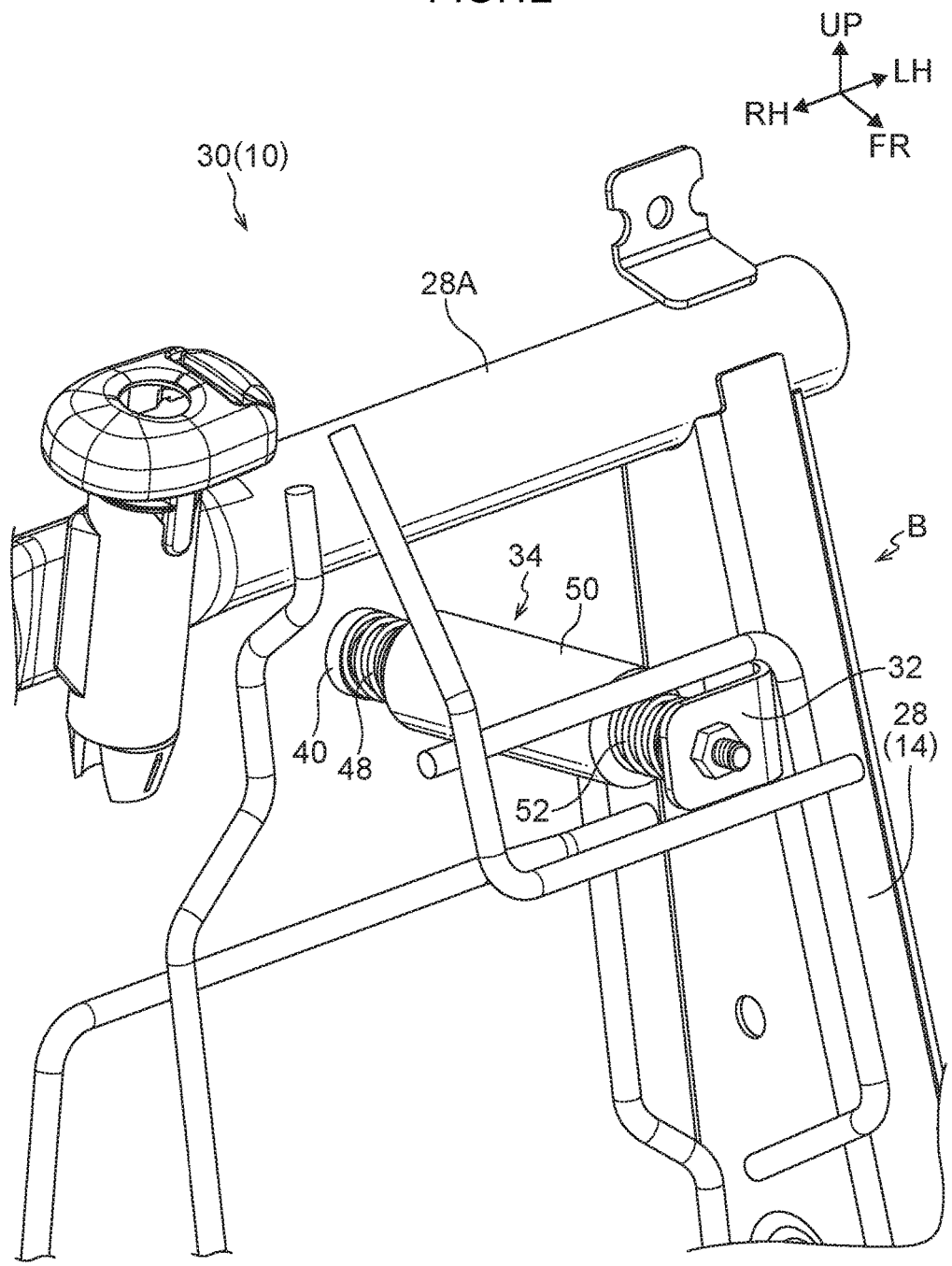
FIG. 12 is a partial enlarged perspective view, corresponding to FIG. 4, showing a fourth variant example of the vehicle seat according to the present exemplary embodiment.

For example, as shown in FIG. 12, the vibration damping device 34 may be arranged along the seat front-and-rear direction of the vehicle seat 10 at the side of the seat back frame 28 of the vehicle seat 10 at which the upper end 28A is disposed (a fourth variant example). With this structure, vibrations of the vehicle seat 10 in the seat front-and-rear direction may be damped.

In this structure, a bracket 32 for the arrangement of the vibration damping device 34 in the seat front-and-rear direction of the vehicle seat 10 is welded to the seat back frame 28. Thus, the orientation of the vibration damping device 34 may be easily specified by changing the orientation of the bracket 32.

Figure 13:
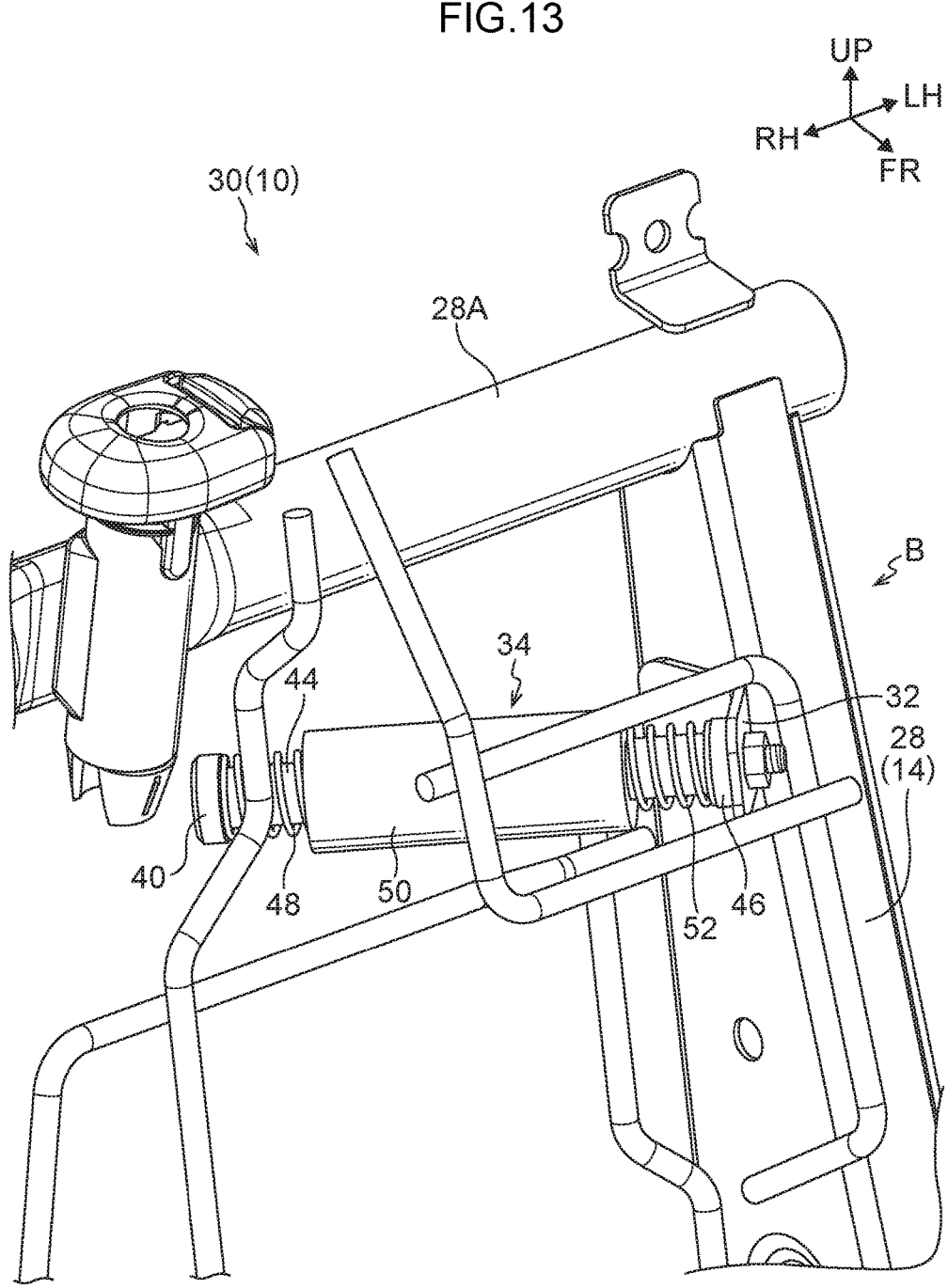
FIG. 13 is a partial enlarged perspective view, corresponding to FIG. 4, showing a fifth variant example of the vehicle seat according to the present exemplary embodiment.

As shown in FIG. 13, the vibration damping device 34 may be disposed so as to include components in the seat width direction, the seat front-and-rear direction and the seat up-and-down direction of the vehicle seat 10 (a fifth variant example). In this case, vibrations of the vehicle seat 10 that include components in the seat width direction, the seat front-and-rear direction and the seat up-and-down direction of the vehicle seat 10 may be damped.

Although not shown in the drawings, a plural number of the vibration damping device 34 arranged in different directions may be disposed at the seat back frame 28. These plural vibration damping devices 34 may be specified so as to have different natural oscillation frequencies from one another. For example, FIG. 14 shows relationships between frequency and amplification factor for a configuration in which one vibration damping device is fixed to a vehicle seat (represented by the dotted line) and a configuration in which two vibration damping devices with different natural oscillation frequencies are fixed to a vehicle seat (represented by the solid line). According to this, the amplification factor may be reduced in one region by a single vibration damping device, and the amplification factor may be reduced in two regions by two vibration damping devices with different natural oscillation frequencies. Thus, with two vibration damping devices with different natural oscillation frequencies, the damping effect may be provided at two frequency regions.

In the exemplary embodiment described above, an example is described in which the vehicle seat 10 at which the vibration damping device 34 of the present invention is disposed acts as a vibrating member, but the vibrating member is not limited thus. For example, although not shown in the drawings, the vibration damping device 34 may be disposed in a washing machine.

Hereabove, examples of an embodiment of the present invention have been described. Embodiments of the present invention are not limited by these descriptions and it will be clear that numerous modifications beyond these descriptions may be embodied within a technical scope not departing from the gist of the invention.

What is claimed is:

1. A vibration damping device comprising:
    a spindle member through which a shaft portion is inserted, the spindle member being movable along a length direction of the shaft portion;
    a first coil spring disposed between the spindle member and a first end portion of the shaft portion in the length direction, the first portion of the shaft portion being inserted through the first coil spring, and the first coil spring urging the spindle member toward a side of a second end portion of the shaft portion in the length direction; and
    a second coil spring disposed between the second end portion of the shaft portion and the spindle member, the second end portion of the shaft portion being inserted through the second coil spring, and the second coil spring urging the spindle member toward a side of the first end portion of the shaft portion,
    wherein,
    an outer side of the shaft portion is covered with a collar member fabricated of resin, and the collar member being disposed between:
    the shaft portion and
    the spindle member, the first coil spring and the second coil spring.

2. A vehicle seat comprising a seat main body that includes:
    a sitting portion on which a vehicle occupant sits;
    a seat back that supports an upper body of the vehicle occupant sitting on the sitting portion;
    a headrest that is provided at an upper side of the seat back and supports a head area of the vehicle occupant; and
    a vibration damping device comprising:
        a spindle member through which a shaft portion is inserted, the spindle member being movable along a length direction of the shaft portion,
        a first coil spring disposed between the spindle member and a first end portion of the shaft portion in the length direction, the first portion of the shaft portion being inserted through the first coil spring, and the first coil spring urging the spindle member toward a side of a second end portion of the shaft portion in the length direction, and
        a second coil spring disposed between the second end portion of the shaft portion and the spindle member, the second end portion of the shaft portion being inserted through the second coil spring, and the second coil spring urging the spindle member toward a side of the first end portion of the shaft portion,
        wherein the vibration damping device is provided at the seat back or the headrest.

3. The vehicle seat according to claim 2, wherein an outer side of the shaft portion is covered with a collar member fabricated of resin, the collar member being disposed between:
    the shaft portion and
    the spindle member, the first coil spring and the second coil spring.

4. The vehicle seat according to claim 2, wherein a spring constant $K_1$ of the first coil spring and a spring constant $K_2$ of the second coil spring are set such that a natural oscillation frequency of the spindle member is the same as a resonance frequency of the seat main body.

5. The vehicle seat according to claim 2, wherein the vibration damping device is provided at an upper end side of a seat back frame that structures a framework of the seat back.

6. The vehicle seat according to claim 2, wherein the vibration damping device is arranged along a seat width direction.

7. The vehicle seat according to claim 2, wherein the vibration damping device is arranged along a seat front-and-rear direction.

8. The vehicle seat according to claim 2, wherein the vibration damping device is arranged to include components in a seat width direction, a seat front-and-rear direction and a seat up-and-down direction.

* * * * *